United States Patent [19]

Kiser, Jr.

[11] 4,078,445
[45] Mar. 14, 1978

[54] COMPOSITE SPROCKET OR THE LIKE

[76] Inventor: Cecil M. Kiser, Jr., 304 N. Main, Newkirk, Okla. 74647

[21] Appl. No.: 756,782

[22] Filed: Jan. 5, 1977

[51] Int. Cl.$^2$ ............... F16H 55/30; F16H 55/14; F16H 55/12; B21D 53/28
[52] U.S. Cl. ................. 74/243 R; 29/159.2; 74/434; 74/443; 74/446
[58] Field of Search ............ 74/243 R, 434, 443, 74/446; 29/159.2

[56] References Cited

U.S. PATENT DOCUMENTS

| | | | |
|---|---|---|---|
| 3,651,705 | 3/1972 | Bertinetti et al. | 74/243 R |
| 3,839,921 | 10/1974 | Haug | 74/243 R |

Primary Examiner—Leonard H. Gerin
Attorney, Agent, or Firm—William R. Laney

[57] ABSTRACT

An improved chain drive sprocket or the like in the form of a sprocket member. The composite sprocket member includes a metallic hub portion having T-shaped lands and T-shaped grooves formed on the outer periphery thereof coaxial with the axis of rotation of the hub portion, and a toothed ring formed of synthetic resin material having an aperture formed therein with T-shaped lands and T-shaped grooves formed on the inner periphery thereof sized and shaped for close sliding coaxial engagement with the corresponding lands and grooves of the hub portion. The hub portion is preferably formed of sintered steel powder impregnated with cupreous alloy. The toothed ring portion is preferably formed of nylon. The drive sprocket may be employed in combination with the power output shaft from a motorcycle power transmission. The composite member may be slightly modified to form a composite spur gear or the like.

18 Claims, 5 Drawing Figures

COMPOSITE SPROCKET OR THE LIKE

BACKGROUND OF THE INVENTION

1. Field of the Invention

This invention relates generally to improvements in power transmission apparatus, and more particularly, but not by way of limitation, to power transmission apparatus employing chain sprockets or gears.

2. Description of the Prior Art

It is well known in the construction of motorcycles to employ a driving and driven sprocket interconnected by an endless chain to provide power transmission from an engine to the driven wheel. The conventional materials employed in the construction of both driven and driving sprockets in motorcycles, and other vehicles, are metallic in nature and include steel, stainless steel, aluminum and various combinations thereof to provide composite sprocket structures.

Many problems are encountered with the use of chain-sprocket drives on motorcycles and other vehicles. Sprocket and chain wear is excessive because of lubrication difficulty in an environment open to all elements including rain, dust, sand, snow and sunlight. Such accelerated wear occurs because the drive chain and sprockets are made of steel and cannot absorb the energy of impact when the vehicle clutch is engaged suddenly. The teeth of the sprockets tend to be bent out of shape in the direction of force applied by the chain. The sprockets, being constructed of steel or other metal, cannot recover their original shape. Similarly, these forces, when applied to the chain, cause the steel links thereof to be stretched beyond their elastic limit. These factors create a difference in pitch between the constant center-to-center distance of the sprocket teeth and the ever enlarging center-to-center distance between the rollers of the chain.

Attempts are constantly being made to lower the noise levels generated in metal to metal chain and gear drive units. One known prior art means of reducing noise involves the machining or molding of the rear ring or large sprocket of a motorcycle of a synthetic resin material such as nylon. This structure results in lower noise, longer wear and reduced lubrication needs.

A steel roller chain running on steel tooth sprockets requires frequent lubrication with oil to prevent heat buildup, rust and corrosion. Such lubrication presents three distinct undesirable effects. The lubricant tends to be thrown off the chain when the vehicle is moving leaving the chain and sprockets vulnerable to water and snow allowing rust and corrosion to occur. As the lubricant is thrown from the moving chain, it is ordinarily deposited on the rear wheel or tire of the vehicle and often on the person or clothing of the rider. Additionally, the existence of lubricating oil on the chain attracts and retains dirt, sand, and other abrasive materials on the rollers of the chain and the teeth of the sprockets where these materials will cause the most wear.

The prior art steel sprocket and chain units are by their nature relatively heavy, requiring additional engine power to turn them. Unnecessary added weight, particularly in the sprocket and chain units, increases the polar moment of inertia of the sprockets and decreases the power to weight ratio of a motorcycle thereby decreasing the performance potential of the vehicle.

Steel chain and sprocket drive mechanisms exhibit relatively high friction and heat generation characteristics especially when there is a breakdown in lubrication as mentioned above. Such heat generation, which is occasioned by the relatively high coefficient of friction between two steel members, results in undesirable power loss in the operation of the motorcycle or other device employing such a power transfer mechanism.

Due to differences in rear wheel designs and spline designs on the power output shafts of various motorcycles produced by different motorcycle manufacturers, it is generally necessary to purchase an entirely different front or counter sprocket and/or rear sprocket to change the gear ratio between the transmission output shaft speed of the driven rear wheel. Ratio changes are desirable because of varied uses to which a motorcycle might be put such as road racing, highway use, moto cross, Enduro, flat track, hill climbing or trail riding.

Efforts have been made in the past to design a suitable driving or counter sprocket for use on motorcycles constructed of synthetic resin materials such as nylon or Delrin. While the toothed portion of the sprockets have been found capable of transmitting sufficient power from the transmission output shaft to the chain, the spline connections between the hub portions of such synthetic resin sprockets and the transmission power output shafts have not proved reliable in transmitting such power from the shaft to the sprocket. Thus, the motorcycle industry has been forced to continue utilizing steel or other suitable metals to construct the entire driving sprocket.

SUMMARY OF THE INVENTION

The present invention contemplates a composite toothed member or the like, having an axis of rotation, comprising a metallic hub portion having T-shaped lands and T-shaped grooves formed on the outer periphery thereof coaxial with the axis of rotation of said hub portion; and a toothed ring portion formed of a synthetic resin material having an aperture formed therethrough with T-shaped lands and T-shaped grooves formed on the inner periphery of the aperture sized and shaped for close sliding coaxial engagement with the corresponding T-shaped grooves and T-shaped lands of the hub portion.

An object of the invention is to increase the efficiency of chain drive power transmission systems.

Another object of the invention is to provide a composite sprocket structure having a metallic hub and synthetic resin toothed ring suitable for use as a driving sprocket in a motorcycle or the like.

A further object of the invention is to provide a composite chain drive sprocket structure having a metallic hub portion and a nylon toothed ring portion wherein the toothed ring portion may be readily removed from the hub portion and exchanged for another toothed ring portion of differing diameter and number of teeth.

A still further object of the invention is to provide an improved chain drive sprocket structure which minimizes sprocket interchangeability problems in motorcycles.

A yet further object of the invention is to provide an improved chain drive sprocket which is economical in construction and operation and provides increased service life for the drive system in which it is installed.

Still another object of the present invention is to provide an improved composite gear structure having a metallic hub and a synthetic resin gear tooth ring.

Other objects and advantages of the invention will be evident from the following detailed description when read in conjunction with the accompanying drawings.

DESCRIPTION OF THE PREFERED EMBODIMENT

Figure 1:
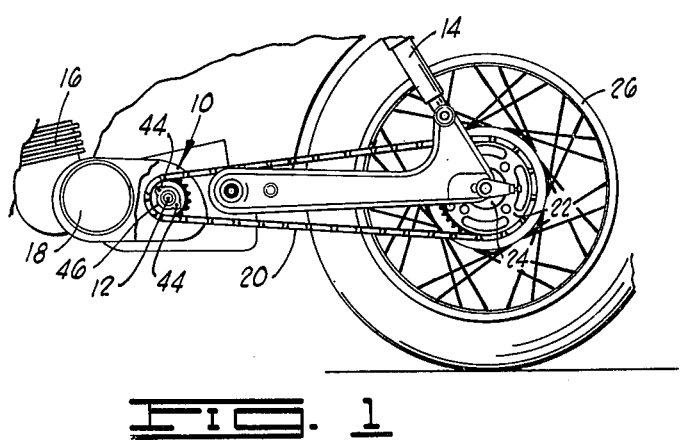
FIG. 1 is a fragmentary side elevation view of the rear portion of a motorcycle incorporating the composite sprocket apparatus of the present invention.

Referring now to the drawings and to FIGS. 1, 2, 3 and 4 in particular, the composite sprocket apparatus of the present invention will be generally designated by the reference character 10. In FIG. 1, the composite sprocket 10 is illustrated installed on the transmission output shaft 12 of a motorcycle 14. The shaft 12 is driven by an engine 16 via a power transmission 18.

An endless chain 20 drivingly engages the driving sprocket 10 and a driven sprocket 22 secured to the hub 24 of the rear or driven wheel 26 of the motorcycle 14.

Figure 2:
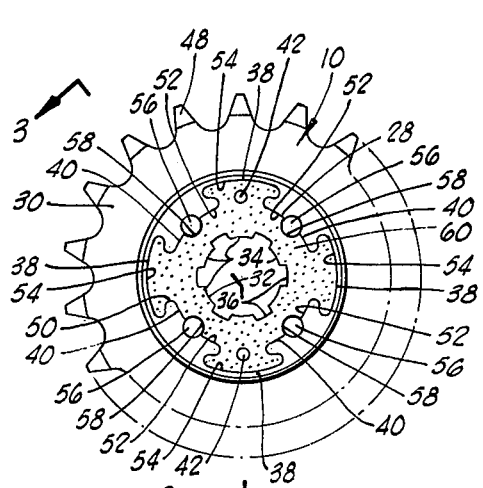
FIG. 2 is a side elevation view of the composite sprocket apparatus of the present invention.
Figure 3:
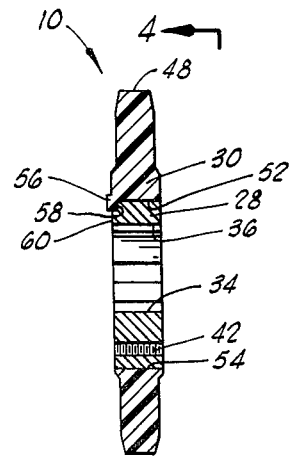
FIG. 3 is a cross-sectional view taken along line 3—3 of FIG. 2.
Figure 4:
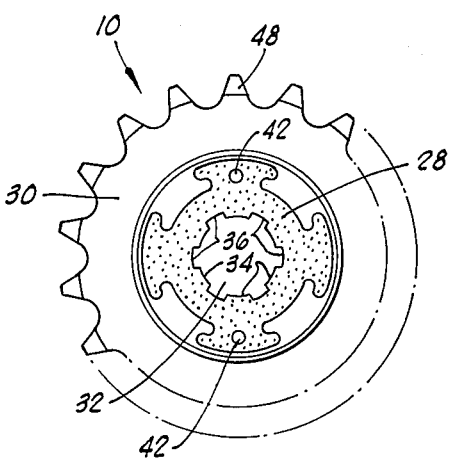
FIG. 4 is an opposite side elevation view of the composite sprocket apparatus of the present invention as viewed along line 4—4 of FIG. 3.

Referring now to FIGS. 2, 3 and 4, the composite sprocket or toothed member 10 comprises a metallic hub portion 28 and a toothed ring portion 30. The metallic hub portion is preferably formed of steel and more particularly is preferably formed of sintered powdered steel impregnated with a cupreous alloy.

The toothed ring portion 30 is preferably formed of a synthetic resin material and is more particularly preferably formed of nylon or a polycarbonate resin. The toothed ring portion 30 may be conveniently injection molded of Dupont Zytel 408 nylon, type 66 modified, or Foster Grant 1059, type 6 nylon.

The hub portion 28 preferably includes an aperture 32 extending therethrough coaxial with the axis of rotation of the hub portion 28. The inner periphery of the aperture 32 preferably comprises a plurality of lands 34 and grooves 36 sized and shaped to be non-rotatably, slidingly received on the splined end of the output shaft 12. It will be understood that the aperture 32 may take other conventional forms to facilitate the non-rotating engagement of the hub portion 28 on corresponding shafts.

The outer periphery of the hub portion 28 comprises a plurality of partially inwardly extending T-shaped lands 38 separated by a corresponding plurality of radially inwardly extending T-shaped grooves 40, the lands and grooves 38 and 40 being coaxially aligned with the axis of rotation of the hub portion 28. A pair of internally threaded apertures extend through the hub portion 28 providing means for receiving threaded bolts 44 therein for retaining the composite sprocket 10 on the output shaft 12 by means of a keeper plate 46 secured to the outer end of the output shaft 12 in a conventional manner. Such means of securement of the sprocket 10 to the output shaft is employed on most Honda motorcycles.

The toothed ring portion 30 includes a plurality of teeth 48 formed about the outer periphery thereof for driving engagement with the drive chain 20. An aperture 50 extends through the ring portion 30 coaxial with the axis of rotation thereof. The inner periphery of the aperture 50 comprises a plurality of radially inwardly extending T-shaped land 52 separated by a corresponding plurality of radially outwardly extending T-shaped grooves 54 with the lands and grooves 52 and 54 in coaxial alignment with the axis of rotation. The T-shaped lands 52 are sized and shaped for close sliding coaxial engagement within respective T-shaped grooves 40 of the hub portion 28 along lines coaxial with the axis of rotation of the composite sprocket 10. Similarly, the T-shaped lands 38 of the hub portion 28 are sized and shaped for close sliding coaxial engagement within the respective T-shaped grooves 54 of the toothed ring portion 30 along lines coaxial with the axis of rotation of the sprocket 10. Preferably, this close sliding engagement between the hub portion 28 and the ring portion 30 of the composite sprocket 10 requires the application of force along the axis of rotation to these two members to achieve a press fit therebetween. The size relationship between the hub portion 28 and ring portion 30 eliminates any requirement for any form of adhesive bond therebetween thus facilitating the interchange of ring portions of varying diameters on a single hub portion. The interlocking nature of the T-shaped lands and grooves of the hub portion and ring portion prevents any radial separation between the two portions of the composite sprocket in operation in response to centrifugal force.

A plurality of protuberances 56 extend radially inwardly from each of the T-shaped lands 52 of the ring portion 30 and are received in corresponding recesses 58 formed in the T-shaped grooves 40 of the hub portion 28 intersecting the end face 60 thereof. The engagement of the protuberances 56 in the recesses 58 prevents relative coaxial movement between the hub portion 28 and the ring portion 30 in one direction. As seen in FIG. 3, the recesses 58 and protuberances 56 prevent movement of the hub portion 28 to the left relative to the ring portion 30 when the composite sprocket 10 is completely assembled.

It will be readily apparent that toothed ring portions 30 having various numbers of teeth 48 may be interchanged on the hub portion 28 to facilitate the convenient changing of speed ratios between the driving composite sprocket 10 and the driven sprocket 22 without necessitating a change in the hub portion 28. Thus, it will be seen, that a number of toothed ring portions 30 may be kept on hand by the owner and operator of a number of motorcycles of different manufacture thus providing him with the capability of conveniently changing speed ratios on these motorcycles in spite of the differences in spline configuration of such motorcycles at their transmission output shaft 12.

It will also be readily apparent that the use of toothed ring portions 30 formed of injection molded synthetic resin materials such as nylon or polycarbonate resin provides a driving sprocket structure which overcomes many of the objections to metal driving sprockets mentioned above, especially in the areas of wear, shock absorption, weight and lubrication. It will further be readily understood that molded synthetic resin toothed ring portions can be manufactured and sold at considerably less expense than individually machined metallic driving sprockets.

Figure 5:
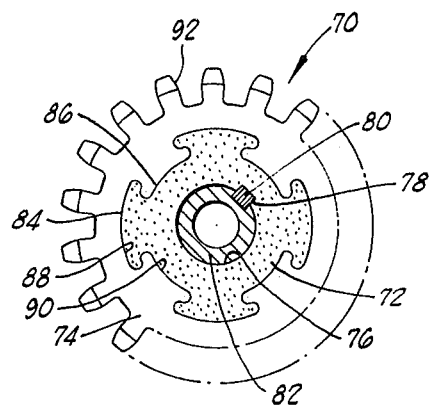
FIG. 5 is a side elevation view of an alternate embodiment of the present invention in the from of a composite spur gear.

Referring now to FIG. 5, there is shown therein an alternate embodiment of the present invention designated by the reference character 70. The apparatus 70 is in the form of a composite spur gear substantially identical in construction to the composite sprocket apparatus 10 described above. The spur gear comprises a metallic hub portion 72 and a toothed ring portion 74 formed of synthetic resin material. The metallic hub portion 72 may be suitably formed of steel and is preferably formed of sintered iron or steel alloy impregnated with a cupreous alloy. An aperture 76 extends through the hub portion 72 along the axis of rotation thereof and includes a keyway 78 formed in the periphery thereof coaxial with the axis of rotation providing means for receiving a key 80 therein to prevent rotation between the hub portion 72 and the shaft 82 to which it is non-rotatingly secured. The outer periphery of the hub portion 72 includes a plurality of radially outwardly extending T-shaped lands 84 separated by a plurality of radially inwardly extending T-shaped grooves 86 closely slidingly engaging corresponding radially outwardly extending T-shaped grooves 88 and radially inwardly extending T-shaped lands 90 formed on the inner periphery of an aperture 92 extending through the ring portion 74. A plurality of gear teeth 92 are formed about the outer periphery of the ring portion 74.

It will be readily apparent that a composite spur gear constructed as illustrated at 70 will provide many of the same advantages previously recited with respect to the composite sprocket apparatus 10. Clearly reduced noise and improved lubrication characteristics as well as reduced cost are advantages possessed by the composite spur gear 70.

The use of sintered steel alloy impregnated with a cupreous alloy to construct the hub portions 28 and 72 discussed above provides manufacturing cost advantages over the conventional methods of machining such hub portions from steel stock although machined steel hub portions may be used.

Changes may be made in the combination and arrangement of parts or elements as heretofore set forth in the specification and shown in the drawings without departing from the spirit and scope of the invention as defined in the following claims.

What is claimed is:

1. A composite toothed member or the like, having an axis of rotation, comprising:
    a metallic hub portion having T-shaped lands and T-shaped grooves formed on the outer periphery thereof coaxial with the axis of rotation of said hub portion; and
    a toothed ring portion formed of a synthetic resin material having an aperture formed therethrough with T-shaped lands and T-shaped grooves formed on the inner periphery of the aperture sized and shaped for close sliding coaxial engagement with the corresponding T-shaped grooves and T-shaped lands of said hub portion.

2. The composite toothed member as defined in claim 1 wherein said metallic hub portion is characterized further as being formed of sintered metal powder impregnated with a cupreous alloy for increasing the strength thereof.

3. The composite toothed member as defined in claim 2 wherein the sintered metal powder of said hub portion is an iron alloy.

4. The composite toothed member as defined in claim 3 wherein the sintered iron alloy is steel.

5. The composite toothed member as defined in claim 1 characterized further to include means formed on said toothed ring portion for engaging said hub portion to positively limit relative coaxial movement therebetween in one direction.

6. The composite toothed member as defined in claim 1 wherein the synthetic resin material forming said toothed ring portion is nylon.

7. The composite toothed member as defined in claim 1 wherein said hub portion includes an aperture formed therein coaxial with the axis of rotation thereof.

8. The composite toothed member as defined in claim 1 wherein said hub portion is characterized further to include means formed thereon for securing said hub portion to a rotatable member for mutual rotation about a common axis.

9. The composite toothed member as defined in claim 1 wherein said hub portion includes an aperture formed therein coaxial with the axis of rotation thereof and having at least one coaxial land end and at least one coaxial groove formed on the inner periphery thereof.

10. The composite toothed member as defined in claim 1 wherein said toothed ring portion is a chain sprocket.

11. The composite toothed member as defined in claim 1 wherein said toothed ring portion includes a plurality of gear teeth formed about the outer periphery thereof.

12. In combination with a wheeled vehicle of the type having a power output shaft driven by an engine through a power transmission system, a driven rear wheel journaled thereon and having a ring sprocket secured thereto, and an endless chain drivingly engaged with the ring sprocket, an improved drive sprocket comprising:
    a metallic hub portion rigidly securable to the power output shaft for coaxial rotation therewith, said hub portion having a plurality of T-shaped lands and T-shaped grooves formed on the outer periphery thereof coaxial with the axis of rotation; and
    a ring portion secured to the outer periphery of said metallic hub, said ring portion being formed of a synthetic resin material having an aperture formed therein with a plurality of T-shaped lands and T-shaped grooves formed on the inner periphery thereof sized and shaped for closed sliding coaxial mutual engagement with the corresponding T-shaped grooves and T-shaped lands of said hub portion, and having teeth formed about the outer periphery thereof drivingly engaging the endless chain.

13. The apparatus as defined in claim 12 wherein said metallic hub portion is characterized further as being formed of a sintered metal powder impregnated with a cupreous alloy.

14. The apparatus as defined in claim 13 wherein the sintered metal powder of said hub portion is an iron alloy.

15. The apparatus as defined in claim 14 wherein the sintered iron alloy is steel.

16. The apparatus as defined in claim 12 characterized further to include means formed on said ring portion for engaging said hub portion to positively limit relative coaxial movement therebetween in one direction.

17. The apparatus as defined in claim 12 wherein the synthetic resin material forming said ring portion is nylon.

18. The apparatus as defined in claim 12 wherein said means for removably securing said hub portion to the power output shaft includes an aperture formed therein sized to receive the power output shaft therethrough and means for preventing relative rotation between the power output shaft and said hub portion.

* * * * *